US008181903B2

(12) United States Patent
Posva

(10) Patent No.: US 8,181,903 B2
(45) Date of Patent: May 22, 2012

(54) AIRCRAFT HAVING THE ABILITY FOR HOVERING FLIGHT, FAST FORWARD FLIGHT, GLIDING FLIGHT, SHORT TAKE-OFF, SHORT LANDING, VERTICAL TAKE-OFF AND VERTICAL LANDING

(76) Inventor: David Posva, Schweiz (CH)

( * ) Notice: Subject to any disclaimer, the term of this patent is extended or adjusted under 35 U.S.C. 154(b) by 886 days.

(21) Appl. No.: 12/281,445

(22) PCT Filed: Mar. 2, 2007

(86) PCT No.: PCT/CH2007/000109
§ 371 (c)(1),
(2), (4) Date: Sep. 2, 2008

(87) PCT Pub. No.: WO2007/098634
PCT Pub. Date: Sep. 7, 2007

(65) Prior Publication Data
US 2009/0008510 A1    Jan. 8, 2009

(30) Foreign Application Priority Data

Mar. 3, 2006  (CH) ..................................... 0345/06

(51) Int. Cl.
*B64C 15/02* (2006.01)
*B64C 15/12* (2006.01)
*B64C 29/00* (2006.01)
*B64C 9/00* (2006.01)

(52) U.S. Cl. .................... 244/12.3; 244/12.4; 244/23 B; 244/56; 244/87

(58) Field of Classification Search ................ 244/12.3, 244/12.4, 23 A, 23 B, 56, 87
See application file for complete search history.

(56) References Cited

U.S. PATENT DOCUMENTS 2,021,512 A * 11/1935  Lake ............................. 296/106
(Continued)

FOREIGN PATENT DOCUMENTS

WO        WO 8800556 A1 *  1/1988
(Continued)

OTHER PUBLICATIONS

Walter Bittner, Flugmechanik der Hubschraube ("Flight Mechanics of Helicopters") ISBN 3-540-23654-6.

*Primary Examiner* — Tien Dinh
*Assistant Examiner* — Joseph W Sanderson
(74) *Attorney, Agent, or Firm* — The Nath Law Group; Stanley N. Protigal; Jerald L. Meyer

(57)    ABSTRACT

Aircraft having two, preferably four or more, rotors (20) in wing hatches (10) which can be closed. The closure mechanism has, at the top, individually curved elements on a rollshutter (scroll/roller blind) (40) and, at the bottom, a set of longitudinal fins (30). One or more propeller/impeller drives are firmly connected to the stabilator (60), which can be pivoted over a wide extent. In hovering flight, the wing hatches (10) are opened and the impeller drives (60), together with the stabilator, are pivoted largely vertically downwards. During the transition to cruise flight, the large flaperons (100) are lowered, and the propeller/impeller drives (60), together with the stabilator, are slowly pivoted to the horizontal. When the forward speed is sufficient, the wing hatches (10) are closed, the rotors (20) are stopped, and the flaperons (100) are raised somewhat again. The pilot has unobstructed visibility through the gap between the wingtips (70).

19 Claims, 6 Drawing Sheets

U.S. PATENT DOCUMENTS

| | | | | |
|---|---|---|---|---|
| 2,988,301 | A * | 6/1961 | Fletcher | 244/12.3 |
| 2,989,269 | A * | 6/1961 | Le Bel | 244/12.3 |
| 3,038,683 | A * | 6/1962 | Rowe | 244/12.4 |
| 3,088,694 | A * | 5/1963 | Stirgwolt et al. | 244/12.3 |
| 3,179,353 | A * | 4/1965 | Peterson | 244/12.3 |
| 3,212,731 | A * | 10/1965 | Kappus | 244/12.5 |
| 3,275,267 | A * | 9/1966 | Martin | 244/52 |
| 3,282,534 | A * | 11/1966 | Lascaris et al. | 244/6 |
| 3,298,637 | A * | 1/1967 | Lee | 244/53 B |
| 4,149,688 | A * | 4/1979 | Miller, Jr. | 244/12.4 |
| 4,469,294 | A * | 9/1984 | Clifton | 244/12.3 |
| 4,626,173 | A * | 12/1986 | Mouille et al. | 416/134 A |
| 4,795,111 | A | 1/1989 | Moller | |
| 4,828,203 | A * | 5/1989 | Clifton et al. | 244/12.3 |
| 5,115,996 | A | 5/1992 | Moller | |
| 5,312,069 | A * | 5/1994 | Bollinger et al. | 244/12.3 |
| 5,320,305 | A * | 6/1994 | Oatway et al. | 244/12.3 |
| 6,254,032 | B1 | 7/2001 | Bucher | |
| 6,450,445 | B1 | 9/2002 | Moller | |
| 6,561,456 | B1 * | 5/2003 | Devine | 244/12.1 |
| 6,808,140 | B2 | 10/2004 | Moller | |
| 6,843,447 | B2 * | 1/2005 | Morgan | 244/12.3 |
| 6,883,748 | B2 * | 4/2005 | Yoeli | 244/12.3 |
| 6,892,980 | B2 * | 5/2005 | Kawai | 244/12.4 |
| 7,275,712 | B2 * | 10/2007 | Yoeli | 244/23 A |
| 7,806,362 | B2 | 10/2010 | Yoeli | |
| 2004/0245374 | A1 * | 12/2004 | Morgan | 244/12.3 |
| 2007/0246601 | A1 * | 10/2007 | Layton | 244/12.2 |

FOREIGN PATENT DOCUMENTS

WO      WO 9933690 A1 *    7/1999

* cited by examiner

AIRCRAFT HAVING THE ABILITY FOR HOVERING FLIGHT, FAST FORWARD FLIGHT, GLIDING FLIGHT, SHORT TAKE-OFF, SHORT LANDING, VERTICAL TAKE-OFF AND VERTICAL LANDING

BACKGROUND

At present, there is only one type of fixed wing aircraft with vertical take-off qualities in the (military) service: The Harrier developed in the 60s of Hawker Siddeley (GB), as well as its succession models. Two other types are in the military test phase and development stage: The Bell Boeing V-22 Tiltrotor (WO91/05704) and the F-35B of Lockheed Martin.

All civil projects have failed because of the high demands of the requirements. By modern and well ductile materials, which are extremely light for their stability (In particular the fiber composite material: CFRP), light and economic airplanes with vertical take-off qualities became possible also for the civil market.

Modern variants of the engines/drive systems: Gas turbine, internal combustion engine/petrol engine, Wankel engine, rocket engine, electric generator combined with high-power electronics and electric motor, have become essential reliable, lighter, more powerful and better controllable, in comparison to 1965 when the Harrier was developed.

Modern computer systems in combination with modern situation and acceleration sensors, permit a reactive control mechanism more reliably and quicker than it is possible with a human hand and thus a stable flight also in difficult to be controlled conditions. On account of this progress the most different ideas for the development of new airplanes with vertical take-off qualities currently exist worldwide. These include, inter alia, Skycar (Paul S. Moller), X-Hawk (WO2006/072960: Rafi Yoeli) and ring wing (U.S. Pat. No. 6,254,032 to Franz Bucher).

Prior techniques showed no subdivision of hover flight optimized components (rotors) on one hand, and cruise flight optimized components (wing, propeller) on the other hand. This results in significantly increased power demand for hover flight, as exemplified by Harrier, F-35B, Skycar, X-Hawk and ring wing; respectively of less efficient cruise flight, as exemplified by Tiltrotor/V22:

For cruise flight, excessively oversized and not optimum hover flight components are not hidden in the cruise flight modus: Tiltrotor, Skycar, X-Hawk and ring wing.
   No change in the more economic cruise flight modus: X-Hawk
   The tiltable drive components, are not right in such a way that the output ray does not paint over the main wings and other components. This results in losses and instabilities by, according to tilt angle different, turbulences: Tiltrotor, ring wing
   No inherent stability by the airplane form in the transitional area of the hover flight in the cruise flight and back: Skycar, ring wing, Tiltrotor
   No clear view in all flight directions (to the top, ahead, to the bottom): Harrier, F-35B, Skycar, X-Hawk, ring wing, Tiltrotor (All mentioned attempts)
   No distribution of the power achievement per rotor on several engines: All mentioned attempts.
   No possibility for the gliding flight landing: Skycar, X-Hawk, ring wing.
   No possibility for the gliding flight landing in the same touch down point like with the hover flight approach: All mentioned attempts.
   No solid-propellant rockets to the damping of an impact with the achievement failure respectively drop in performance shortly before the landing in the hover flight: All mentioned attempts.

DETAILED DESCRIPTION

Figure 1:
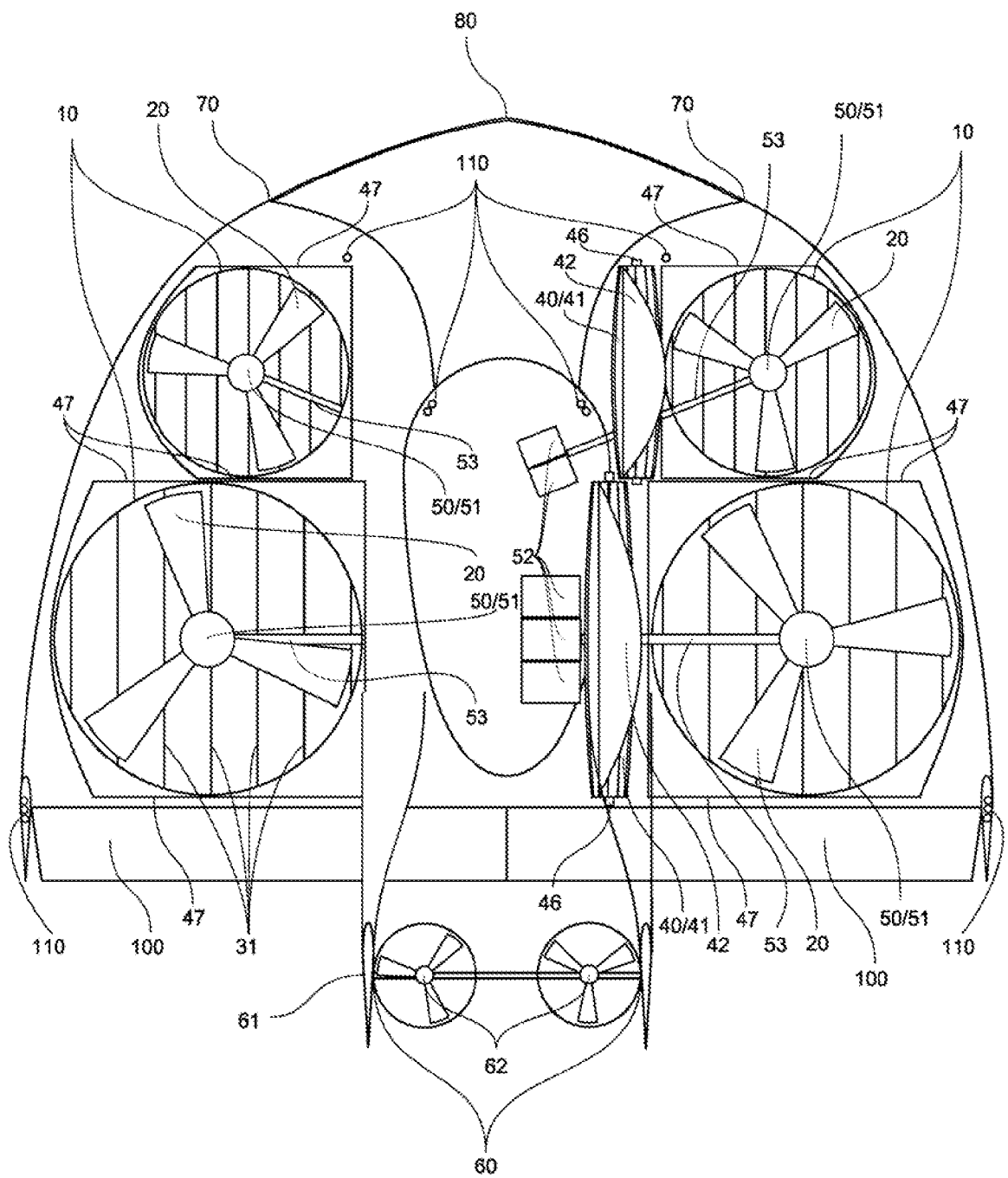
FIG. 1 is a diagram showing an airplane, in a top view, in the hover flight modus.

Physical, aerodynamic, economic and technical base conditions on airplane with vertically start qualities and land qualities consist of:

a) The hover flight is more energy-intensive and more expensive accordingly than the cruise flight by a surface airplane.
b) The power demand in the hover flight rises disproportionately with additional weight.
c) The power demand in the hover flight sinks, mostly under proportionally, by enlargement of the rotor surface when keeping the same weight.
d) The power demand in the hover flight is strongly dependent on the optimum dimensioning, construction and adjustment of the rotors. Examples of optimal configuration include optimum small angle of attack, optimum profile form, thickness and depth, length, twist (variance of the angle of attack with increasing radius), number of the rotor blades, distortion with suitable load, and adjustment with the drives. This is described in Walter Bittner, *Flugmechanik der Hubschraube* ("Flight Mechanics of Helicopters") ISBN 3-540-23654-6.
e) During hover flight, the optimized rotor is a relatively inefficient propeller for acceleration in both calm air and quickly streaming air. When the rotor is optimized for acceleration of calm air for hover flight conditions, even with variable pitch, this rotor is inefficient for the acceleration of quickly streaming air. On the other hand a propeller optimized for quickly streaming air in cruise flight will be inefficient for generating static thrust in calm air. In particular twist and profile are not able to be optimized for both calm and quickly streaming airspeed conditions. Therefore, if the rotor performs well in hover flight, it would perform poorly in cruise flight, and vice-versa.
f) Horizontal flight in the hover mode (as a helicopter) is more and more ineffective, in comparison to fixed wing aircraft, at increasing speed. The rotor already reaches a difficult-to-overcome barrier before the aircraft reaches half the speed of sound. There are designs of Sikorsky and other helicopter manufacturers for helicopter who should be able to fly faster; nevertheless the forward moving rotor blade must not break through the sonic barrier if the rotor is to remain efficient. The feasibility is very much disputed and these modified helicopters will not also be especially efficient in fast horizontal flight.

g) The stable transition of the hover flight to the cruise flight and back allows an efficient cruise flight as a fixed wing aircraft, however, shows a significant challenge to the whole airplane system.

Transition stability is obtained from the airplane form, which has good flight characteristics and its own inherently stable slow flight characteristics with closed, partially open, as well as quite open rotor hatches, the arrangement of the rotors and flaps position. During transition, the arrangement of the rotors provides its own stability in the hover flight, as well as cruise flight, good distribution around the aircraft's center of gravity and from the flaps position, which provide good levers for correction forces. In that circumstance, no annoying turbulence and forces are created by swinging the impeller axis from the vertical in the horizontal. The drive systems have sufficient power/thrust reserve and the control system affords quick reaction to control signals to the controlling flaps, providing good lever force and good effectiveness in the suitable speed area. Control or steering mechanisms of all dynamic systems are optimally supported. This is assisted by the computer system, which steers and stabilizes the airplane responsive to the pilot's input and the information from situation sensors, speed sensors, acceleration sensors and achievement sensors.

h) An in proportion to usual fixed wing aircraft, a large wing surface results in a small wing loading with accordingly good slow flight characteristics; however, this generates, in comparison to a classical fixed wing aircraft, greater air resistance, primarily in fast cruise flight.

Given the base conditions, it is desired to provide an inherently stable fixed wing aircraft with vertical take-off and vertical landing qualities. The aircraft should be light, with sufficient power for vertical take-off, rotors optimized for hover flight. Cruise flight drives should be usable in the hover flight for support and control (steering). Transition hover flight/cruise flight any time should be stable. Hover flight components should hinder cruise flight only minimally. Cruise flight should be faster and more economical than helicopter flight. Take-off and landing should be achievable both in the hover mode and in the cruise mode (like fixed wing aircraft) without problems and economically.

"Hover flight" or "hover modus" ("Like a helicopter") means a flight modus with no or little horizontal speed at which the needed lift is produced by the acceleration of air which had no speed in relation to the aircraft. Usually, and as described in the present disclosure, the air is accelerated using rotors rotating around a vertical axis, downwards. In this description the airplane is described as being in hover flight modus so long as air is blown down through the rotor wing hatches.

"Cruise flight" or "cruise modus" ("Like a fixed wing aircraft") means a flight modus with minimum forward speed, meaning a forward speed which is no slower than a predetermined limit or stall speed, in which the lifting force is produced by aerodynamic properties of rigid wings. Usually, and as described in the present disclosure, the air flows, with respect to the aircraft, from the front around the airfoil of the wings and is accelerated somewhat downwards by the wings to generate a difference in pressure beneath the wings to the pressure above the wings. The pressure difference is influenced by the air speed and the angle of attack of the wing and other parameters, generally following the principles of fixed wing flight. As will be described, no air is blown through the wing hatches in the cruise flight modus.

"Transition flight" or "transition modulus" therefore overlaps to a significant degree with hover flight modus and to a lesser extent with cruise flight modus. Accordingly, the aircraft is always in hover or in cruise mode when in flight.

It is desired to provide an airplane form and airplane components, so that these provide a stable vertical take-off, hover flight and vertical landing, but also the stable transition in a stable and economic cruise flight and back in the hover flight modus. This is achieved by:

1. The partitioning into the hover flight components and into the cruise flight modus components. The rotors 20 are optimized for the hover flight and also are used only in the hover flight, while the propulsion systems required for the cruise flight are optimized above all for the speeds of the cruise flight, but can be also used for the control (steering mechanism) and at most support in the hover flight.
2. The concealment (hiding) of the hover flight rotors 20 in the cruise flight in a large closeable wing hatches 10, so that the rotor circle surface load remains in the hover flight in a portable frame and originates in the cruise flight an almost classical, inherently stable airplane form, with aerodynamically good wings with an unusually long wing chord (only slightly increased aerodynamic drag compared with classical wing chord of classical fixed wing aircraft of the suitable scale), but to good slow flight characteristics.

With closed wing hatches, originate practically airtight, close (shut) as well as well lift-effective wings, poor in air resistance. High cruise flight speeds and consumption values are thereby possible almost like with comparable fixed wing aircraft. A slightly larger consumption results from additional weight of the hover flight components and slightly greater air resistance by the wings configured around the hover flight components. The consumption of the described airplane is with the same speed clearly smaller as the consumption of a comparable helicopter in fast cruise flight. With a comparable motorization the airplane also achieves a clearly higher cruise speed. The power demand is smaller in the hover flight in comparison to other vertical planes, with the same take-off weight, for two reasons:

1.) the hover flight rotors are used only for the hover flight and, therefore, can be optimized specifically for hover flight, thereby resulting in less power loss.
2.) The hover flight rotors are well hidden in the cruise flight aerodynamically, so that the rotor surface can be dimensioned relatively greater. The possibility of hover flight allows the airplane to be independent of runways for take-off and landing.

Because the rotors are wrapped up at the side by the wing, the airplane (in contrast to helicopter or Tiltrotor) is less susceptible to contact with ropes, cables, aerials or other obstacles.

By the arrangement of the swiveling longitudinal fins along the main flight direction, the rotors exiting air can become deflected in the hover flight quickly and exactly measured to the left or right. The airplane, without the whole airplane must be tilted around the longitudinal axis/roll-axis, can be thereby accelerated very exactly after left or right. The airplane can be rotated by the deflection with the front rotors according to right or left and the opposite deflection with the rear rotors around the high-level axis.

The generated lift can be varied, in particular in the area of the ground effect, by a reflecting-symmetrical deflection of the aerial ray to the outside (away from the airplane) or inside (below the airplane) very quickly.

Because the longitudinal fins can be swung very fast by open in the closed position (and vice versa), the airflow generated by the rotors can be stopped or be admitted with the transition of the hover flight in the cruise flight exactly according to the need. In particular a mostly undesirable airflow beneath the wing hatches upwards can be prevented.

Because the longitudinal fins in the hover flight are in the streaming out air of the wing-rotors, there originates from this a certain loss in the form of aerodynamic drag of the open longitudinal fins in the airflow generated by the rotors. On the other hand, the loss is reduced by the set of longitudinal fins, in particular in the front and rear area of the hatches, by the reduction of the twist of the airflow generated by the rotors what increases the lifting force slightly.

An absolutely smooth surface can not be achieved with a lamella/longitudinal fins construction. Nevertheless, this is not so important on the wing underside from aerodynamic viewpoint. Special bends are also rather difficult with a lamella construction; however, the wing underside may be configured to be substantially planar with little difficulty. Further, the fact that the lamella construction does not quite close in an airtight seal what can be ignored if the hatch locking mechanism on the top seals the hatches better.

Individually curved elements to close the top of the wing hatch is better for meeting the aerodynamic need of the top of the wing. The edges of the elements need to have a form, interlocked and with sealing material, that when pushed together along the leading edge, results in a practically airtight surface. In addition, the carrier shade is made from a material, such as rubber or rubber-coated material, so that this also contributes to the sealing. A very smooth and optimally stooped wing top results from the pushed together elements. In configuring the covers, the wing top should show a certain curvature and mostly a smooth surface for aerodynamic reasons. From entire shifting of the elements beside the wing hatches results in no loss in the hover flight. Supplying the elements at the side beside the hatch needs a suitable space in the wing or the at most adjoining fuselage. Further the opening and closing of the hatches takes a little longer than, for example it lasts with a closing mechanism by longitudinal fins. Also the airflow cannot become deflected like with the longitudinal fins.

A higher degree of failure security is achieved by the use of multiple engines per rotor and the whole power must not be produced by a single engine. The engine can be thereby shorter in the wing, resulting in smaller vertical axis length, in order to allow creation of a thinner wing in order to reduce air resistance in the cruise flight.

For the cruise flight, propulsion impellers are to be used preferably, which are effectively "propellers in a tube". Nevertheless, depending on the desired cruising speed free-rotary propellers or jet turbines or rocket engines are also usable. By the use of tiltable drive gondolas, down swung and set off behind the center of gravity, the hover flight can be supported, in addition, in particular an additional control is possible around the airplane lateral (pitch) axis. In addition the airplane can be accelerated in the hover flight by the modification of the tilting angle and the generated force, forwards and back. While swinging the drive gondolas in the horizontal and back in the vertical the output jet air stream doesn't touch neither the main wings nor the fuselage or other aerodynamically important airplane parts, so that no tilt angle dependent turbulence or undesirable forces originates. The aerodynamics and own stability of the airplane is influenced by the aerial suction cone only slightly negatively.

The airplane, according to the instructions of the pilot, in the hover speed area is accelerated by swinging the drive gondolas into the horizontal position for cruise flight, and therefore the continuous change from the hover flight into cruise flight is rendered possible. The change from the speed area of the cruise flight in the hover flight, can be achieved on one hand by the reduction of the power (advancing force). In addition at slow speeds the deceleration can be supported by swinging the drive gondolas continuously down and even slightly to the front.

A so-called thrust vectoring is allowed by swinging the drive gondolas what improves in particular the maneuverability in the slow flight strongly.

By the view gap between both wingtips the pilot has absolutely unobstructed view from vertically down, to the front, to vertically upwards. This is in particular for very precipitous to vertical landing and take-off flights to afford significant advantage.

Neither the view, nor the aerodynamics is substantially affected by the two connected bars shaping a vertex; however, the bars help to protect the aircraft in collisions with ropes, cables or antennas in the flight and protects the cockpit glazing from obstacles with the landing roll and while maneuvering on the ground. The convex contour originating with it is an additional security profit in comparison to helicopter and Tiltrotor in addition to the enveloped rotors and impellers.

Figure 9:
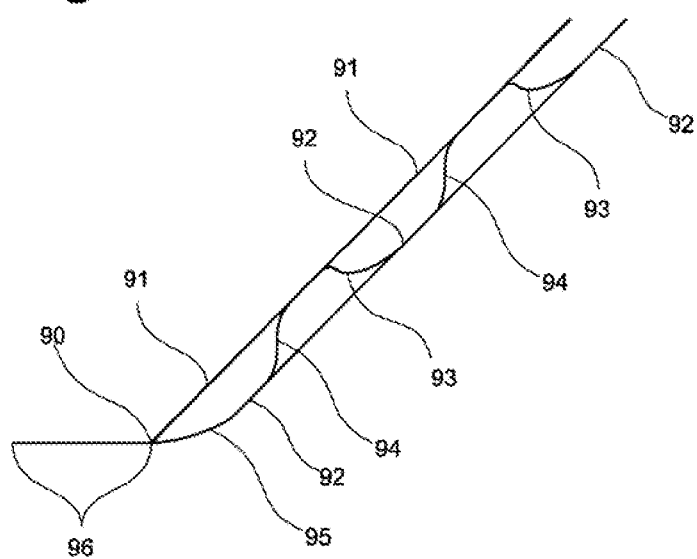
FIG. 9 is a diagram showing exemplary land flight paths in the hover flight modus and in the cruise flight modus, showing a common touch down point.

FIG. 9 is a diagram showing exemplary land flight paths in the hover flight modus and in the cruise flight modus, showing a common touch down point. By the above-described flight characteristics, the same precipitous angle of approach or glide path with the same touch down point can be used in the landing procedure in both flight modes. According to the desires of the pilot or because of external circumstances (e.g., landing field occupied, instruction by flight directing center, bad visibility) or technical circumstances (e.g., drop in performance, engine failure, fuel shortage) the flight modus can be changed without cancelling the approach. The approach takes place in the cruise flight modus, or at most in the gliding flight, with substantially smaller angle of attack and accordingly larger sink rate and forward speed. With the cruise flight landing a relatively short landing roll distance 96 is required. The landing roll distance with the cruise flight landing can be minimized further strongly by the application of the rotors 20 or solid-propellant rockets 110 at the touch down. With the landing in the hover flight modus, no landing roll distance is required.

The flaperon permits not only the regulation of the lift, but also a slow cruise flight. The flaperon permits the transition of the hover flight in the cruise flight, without or with a minimum angle of attack of the body, so that the, by the rotors 20 in the main wings after forces are generated by the rotors 20, do not brake the acceleration of the airplane against forward motion.

Referring again to FIGS. 1 and 2, solid-propellant rockets 110 are very light in proportion to the stored energy and are small, as well as are long-lasting. If ignited shortly before the touch down or with the touch-down in the event of a partial or entire failure of the lift systems in the deep hover flight, the rockets 110 can minimize impact or prevent the collision with obstacles in the landing roll. Because the propulsion cannot be easily steered with the burning solid-propellant rockets 110, the solid-propellant rockets are individually releasable by outlet openings 111. The solid-propellant rockets 110 are released as soon as their propulsion significantly interferes with flight control. The propulsion can be steered or control of the solid-propellant rockets can be achieved by a certain amount. With the failure of hover flight components above a height sufficient for safe recovery, the change in the cruise flight is mostly the more meaningful "way out," as compared with a hover flight landing with rocket support.

The disclosed subject matter provides an aircraft with sufficient performance and performance reserves achieved in connection with an optimized acceleration of calm air down, so that the airplane weight can be certainly carried in the hover flight. Several relatively large optimized rotors are provided. When required, several engines 51/52 per rotor can be used. Solid-propellant rockets 110 can be used as an additional power reserve to compensate power drops or complete failures of the rotor engines.

The aircraft provides situation control and stabilization in the hover flight around all 3 airplane axes and in all 3 space directions.

Rotation and stabilization are achieved about longitudinal and lateral (pitch) axis by individual performance regulation of the rotors arranged around the center of gravity 20. Translation to the top and beneath the aircraft by the collective performance regulation of the rotors 20. Translation sidelong by the collective deflection is achieved by means of the a set of longitudinal fins 31. Rotation around the high-level axis by the contradicting deflection front against the rear set of longitudinal fins 31. Translation against forward and aft moments is achieved by swinging the impeller gondolas 62. Rotation and stabilization around the lateral (pitch) axis is achieved by the performance regulation of the impeller drives 62. The front rotors 10 can be appropriated by the special wing form farther in front by which those have a larger lever arm and have an accordingly greater influence on the rotation moment around the lateral (pitch) axis.

The aircraft provides good control possibilities, good support in the form of arrangement of the impulses and stabilizing form, no unnecessary impediment in the form of view and turbulence for the transitions of the hover flight in the cruise flight and back. The large wing surface permits, in the teamwork by the approximate delta form and the classical dihedral form, meaning that the of the wings around the longitudinal and high axes, in that the wing tips are a little higher than wing roots. This results in an inherently stable slow flight.

The wing hatch closure mechanism of the rotor hatches 10 permits the change in the cruise flight. The hatch locking mechanism permits a quick close and open of the hatches 10 against the area beneath the aircraft. The aircraft is able, with sufficient forward speed, in combination with the contribution of the flaperons 100 after claim 8 and an increase of the angle of attack, to achieve a fast change from the lift by the hover flight rotors 20 to the lift by the aerodynamic qualities of the wings. This provides a transition from hover flight to cruise flight.

With the transition from the cruise flight in the hover flight, in the suitable speed area and the suitable angle of attack, the hatches 10 on top can be opened, the open the hover flight rotors 20 already start spinning, and the a set of longitudinal fins 31 after claim 1b exactly and slowly open when the force of the rotors 20 is able to compensate for the pressure from beneath the wing. As a result, no sudden change of the forces are effected, and no aerial current by the rotor hatches 10 are generated from beneath the aircraft upwards.

A classical passive stabilization around the lateral (pitch) axis occurs through the stabilator set off to the rear 60. An active control occurs through the tiltable stabilator impeller gondola combination 60 around the lateral (pitch) axis or vertical component. Besides, the output jet of the impeller gondola 62 doesn't touch no airplane parts, so that also no tilt angle dependent turbulence originates.

Due to the view gap, the pilot has clear view in all meaningfully possible flight directions. This means he sees unhindered in an always meaningful wide curve 72 of vertically down about horizontally forwards to vertically upwards; as well as a little bit more than the whole front upper quarter hemisphere, including points on the left and on the right and curves from the front to on top.

Due to the large flaperon 100 at the wing end which are used as a combination by aileron and flaps can be already steered with low speed to the front around the longitudinal axis/roll-axis. In addition, the lift generated by the wings can be steered with the flaperons 100, so that the airplane weight is already carried on low speed to the front, respectively, the undesired deceleration resulting from the rotor forces directed to the front can be reduced, by enabling small angles of attack of the airplane.

Though the hatch locking mechanism 40 on the wing top after claims is slower for opening and closing than that on the wing underside, the changes, while continuously opening which increasing air resistance and the decreasing lift is also continuous. Therefore, the pilot and the airplane control are not subject to surprise by a sudden change. Upon closing lift gets continuously better and the drag smaller, so that the flight behavior continuously improves.

The airplane also flies stably with hatches open on top 10, and behaves solidly as a fixed wing aircraft in the cruise flight, although with substantially increased power demand. The airplane is dimensioned in such a way that speed areas overlap for the cruise flight with on top to open hatches 10 with the hover flight speeds. In this speed range, the aircraft is solidly flyable for both flight modes. Both flight modes can take place with hatches open on top by employing and shutoff of the rotors 20 in synchronization with opening and closing of the longitudinal fins 31 from beneath the aircraft. A reversible change is possible at any time of the cruise flight in the hover flight and vice versa.

Continuous forward acceleration is possible until the speed range of cruise flight and deceleration of forward speed stop in the hover flight By the tilting the drives 62, a forward thrust force originates, so that the airplane can be accelerated forward. By the air resistance on the one hand and, on the other hand by the possibility of swinging the drive 62 slightly forwards, the airplane is decelerated to a complete stop.

A minimum of obstruction, including obstruction from air resistance, destabilizing, weight, is caused by the hover flight components in the cruise flight. The concealed hover flight components 20 minimally interfere aerodynamically in the cruise flight. Only as a result of the unusually long wing chord the wings produce a minimally larger air resistance than a standard wing for a usual fixed wing aircraft would produce. The hover flight components 20 do not generate no additional turbulence or imbalances in the hidden state. By the optimum interpretation of the hover flight components 20 the additional weight is relatively small. Though the set of longitudinal fins 31 on the wing underside preclude a completely smooth wing surface, nevertheless, since this is located on the wing underside, the effect is less significance due to overpressure in that area. A special contour or profile of the surface is not required in most parts of the wing underside. Only a very small part of the wing underside is significantly affected by surface turbulence generated by the unevenness as a result of the longitudinal direction of the longitudinal fins 31.

As a result of aerodynamic needs achieved by optimally curved and precisely into each other fitting elements 41 of the wing hatch closure mechanism 40 on the wing top, an airtight wing with good lift values, small air resistance and desired good slow flight characteristics is achieved.

The aircraft exhibits economic power consumption and economic control or steering mechanism in cruise flight. The concealed hover flight components 20 interfere only very minimally aerodynamically in the cruise flight. The wings exhibit a classical dihedral form and approximate delta form. The wings in combination with the classical side tail units provide inherent stability about the longitudinal and the vertical axes in the cruise flight, so that minimal undesirable flap deflections are necessary. By means of the classical flaperons/ailerons 100, the aircraft can be steered around the longitudinal axis/roll-axis. By use of a classical side rudder aft of the yaw axis, the aircraft can be rotated around the yaw (vertical) axis. The stabilator can be rotated around the pitch (transverse) axis. The horizontal tail unit set off to the rear as a stabilator imparts inherent stability around the pitch (lateral) axis. The airplane is steered by the stabilator, the flaperons and the rudder and pushed by the drives optimized for cruise flight in the gondolas 62 attached to the stabilator.

The aircraft design results in reduced weight, which, in addition to reduced dry weight, reduces fuel consumption The lower power demand in the hover flight results in lower total weight of the engines. Large rotor diameters are allowed by the large wing hatches 10, which reduces the power demand in the hover flight. By the optimization of the rotors 20 for the hover flight, including ideal angle of attack, ideal sheet depth and ideal sheet profile there is no requirement that the rotors be employed in cruise flight. Therefore, the power demand in the hover flight, in comparison to helicopters and other attempts for airplanes with vertical take-off qualities, is further minimized. In addition, no cyclic and probably also no collective blade adjustment is necessary for the control what allows also a unique optimum rotor blade twist. The performance reserve in the relatively light solid-propellant rockets 110, the performance reserve of the engines 51/52 can be limited. Substantial fuel is saved by an economic cruise flight during the very dominant flying time portion, what also minimizes the take-off weight.

By the hiding of the hover flight components 20 in a nearly optimum wing arise, in comparison to a classical fixed wing aircraft, almost no additional losses in the cruise flight result. By the extensive optimization of the cruise flight drives 62 for the fast cruise flight arises, in comparison to helicopters and other attempts for airplanes with vertical take-off qualities, a substantial fuel saving. In comparison with classical fixed wing aircraft, appreciable differences should not exist, because their drives can not be optimized completely for the travel flight only. This is because thereby extremely long take-off rolling distances and bad climb flight achievements would arise.

By use of a large flaperon 100 and large wing area, good slow flight characteristics arise, even if the wing profile is optimized rather for the fast cruise flight. The inherently stable airplane form in cruise flight as a whole reduces required flap use, which also leads to fuel savings.

FIG. 1 is a diagram showing an airplane, in a top view, in the hover flight modus. The drawing shows the airplane from top in the hover flight modus with open wing rotor hatches 10, stabilator drive combination 60 down swung, right half so far transparent, that also inside enclosed components become visible. The aircraft is depicted with one of the wing rotor hatches of each wing positioned in front of the other. In addition the front wing rotor hatch is smaller than the rear wing rotor hatch. The stabilator drive combination is connected with the rest of the aircraft with a twin boom structure. The spokes for the connection of the central rotor engines 51 are not shown in the drawing.

Figure 2:
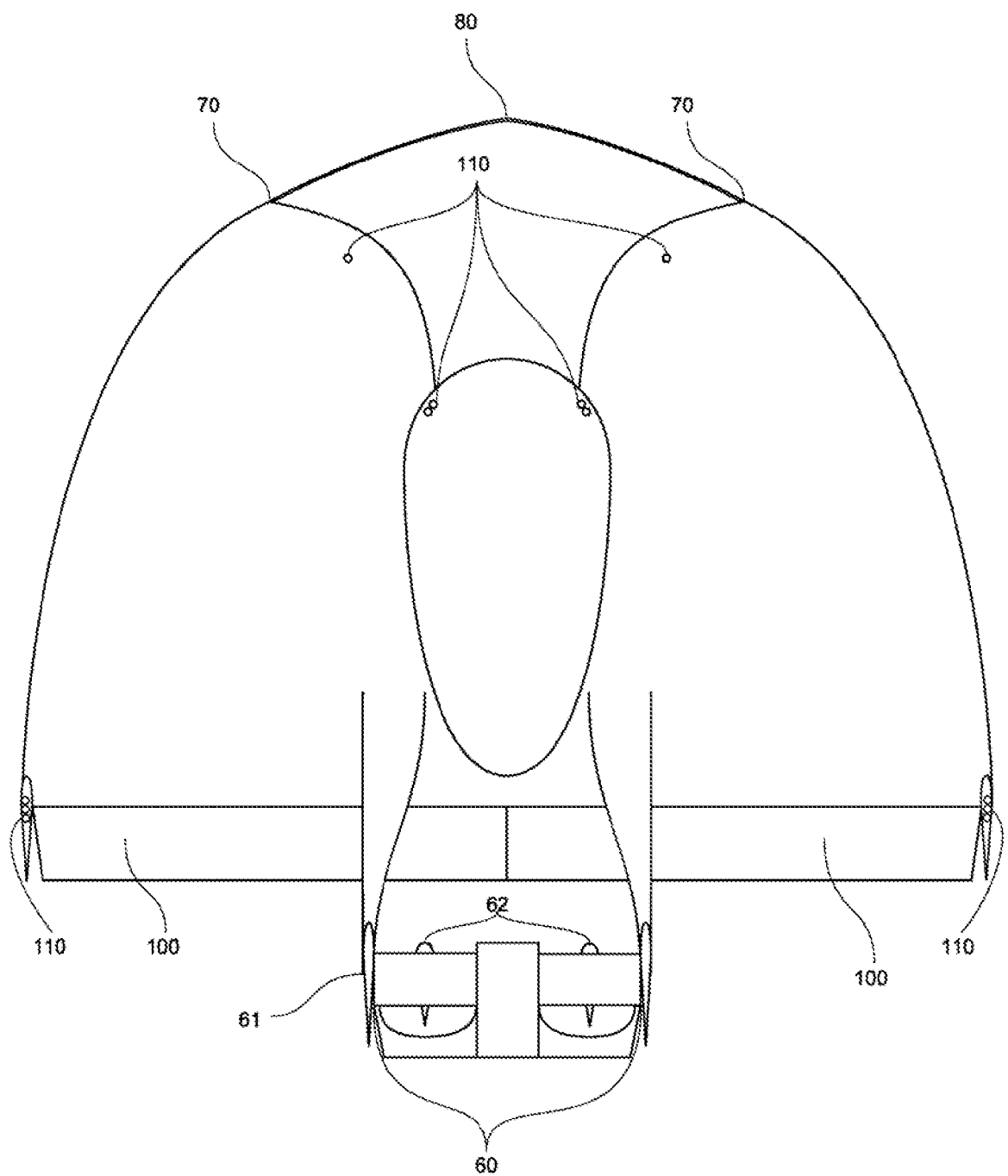
FIG. 2 is a diagram showing an airplane from top in the cruise flight modus.

FIG. 2 is a diagram showing an airplane from top in the cruise flight modus. The drawing shows the airplane from top in the cruise flight modus with closed rotor hatches 10, stabilator drive combination 60 swung to horizontal.

Figure 3:
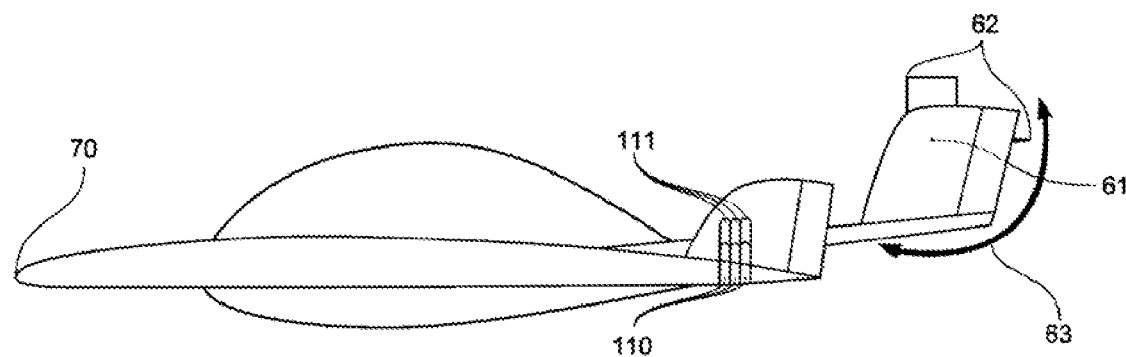
FIG. 3 is a diagram showing an airplane from the side in the cruise flight modus.

FIG. 3 is a diagram showing an airplane from the side in the cruise flight modus. The drawing shows the airplane from the side in the cruise flight modus (stabilator drive combination swung to the back), with schematic illustration of the tilting angle 63 of the stabilator drive combination 60. The vertex of the bars 80 and the classical gear/wheels are left out, the dihedral form of the wings is not shown.

Figure 4:
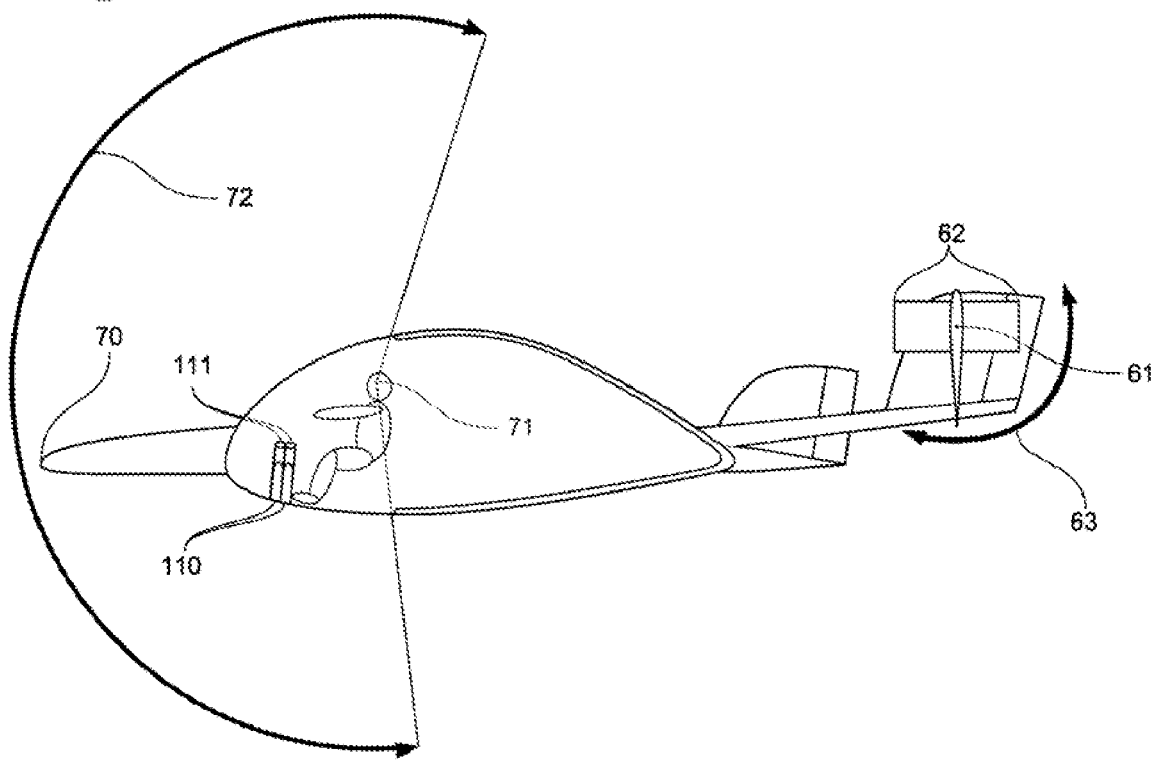
FIG. 4 is a diagram showing a profile at the middle of the airplane, with schematic illustration of the tilting angle of the stabilator drive combination and the view angle of the pilot.

FIG. 4 is a diagram showing a profile at the middle of the airplane, with schematic illustration of the tilting angle of the stabilator drive combination and the view angle of the pilot. The depicted profile shows a schematic illustration of the tilting angle 63 of the stabilator drive combination and the view angle of the pilot 72. The vertex of the bars 80 and the classical gear/wheels are left out, the dihedral form of the wings is not shown.

Figure 5:
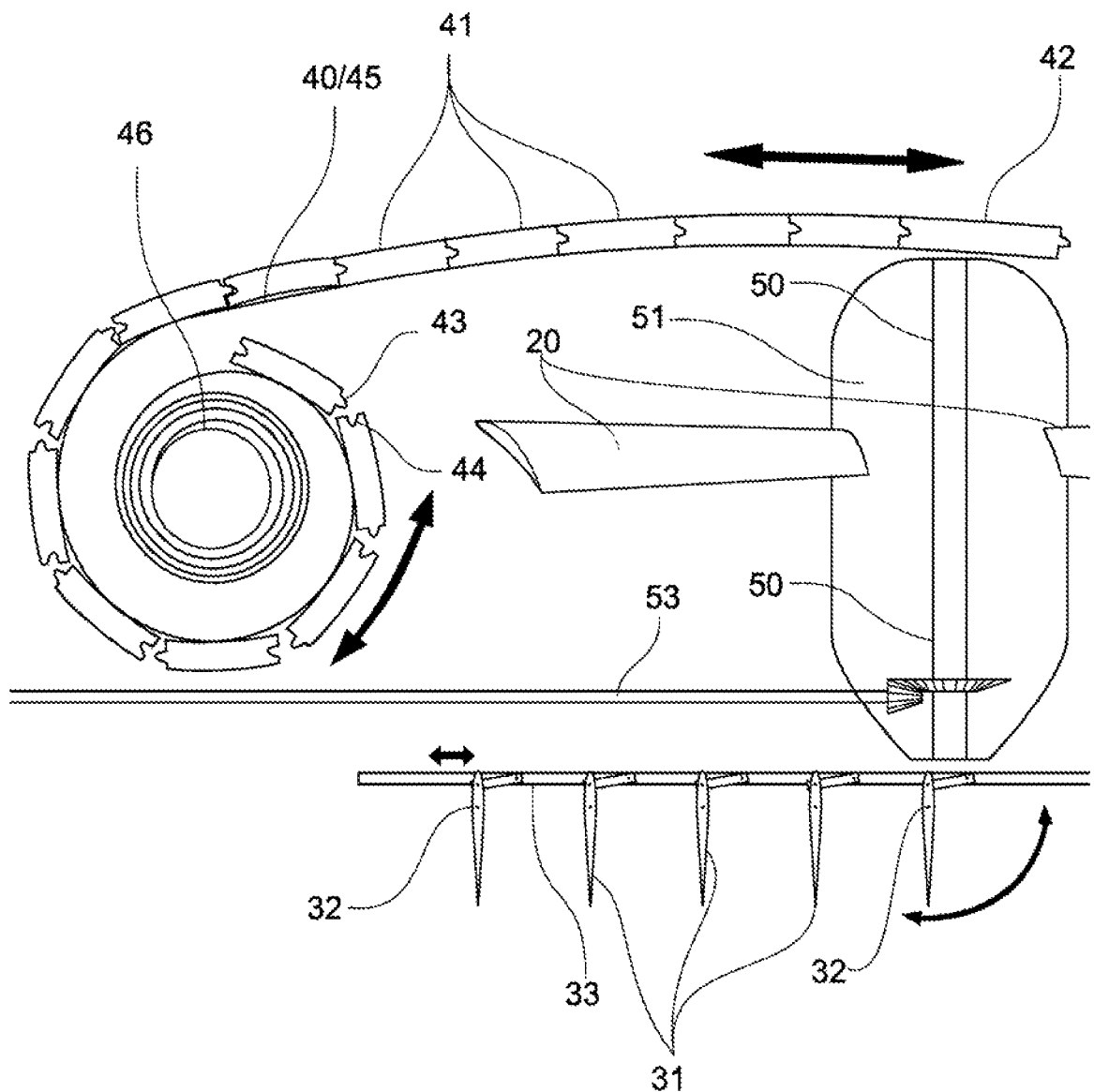
FIG. 5 is a schematic diagram (not equally scaled) showing a cross section through a hatch of the aircraft.

FIG. 5 is a schematic (not equally scaled) cross section through the hatch. Lower hatch closing mechanism with a set of longitudinal fins (turnable around the longitudinal axis/roll-axis) 40, the upper hatch locking mechanism with the roll-shutter 40 and the at the slidable wing elements 41 attached to the flexible tape 45 for the transport of the movable wing elements. Illustrations of the positioning of the hover flight rotors 20 and their engines 51 in between the closing mechanisms. The spokes for the fixation of the central rotor engines 51 are left out. The schematic is scaled to the airplane in FIGS. 1-4, and if drawn to scale, the depicted features would be less bulky and the rotor blades 20 longer.

Figure 6:
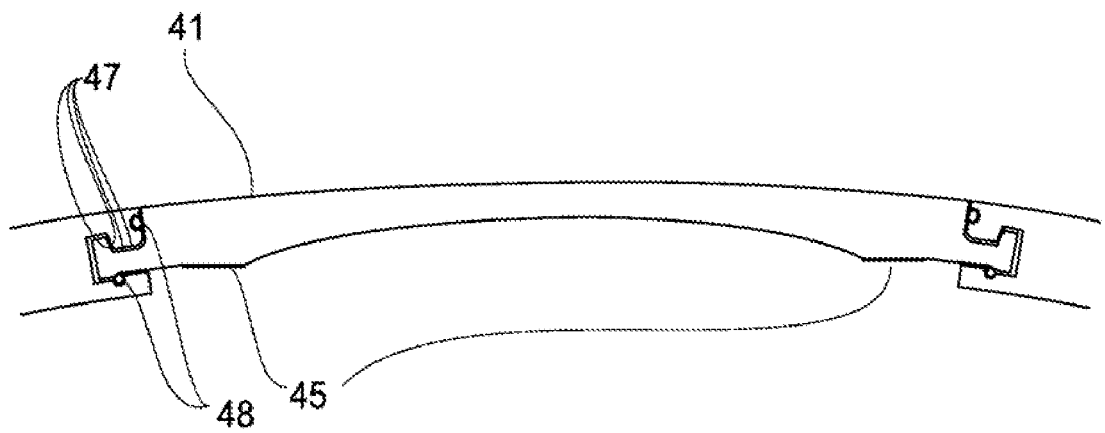
FIG. 6 is a schematic diagram (not equally scaled) profile of an upper hatch closing mechanism.

FIG. 6 is schematic (not equally scaled) profile of the upper hatch closing mechanism with an at the side adjustable wing element right on it 41 as well as the lateral anchorage of the elements 41 at the height of the rotor hatches 10 (Not scaled to the airplane in the FIGS. 1-4. To fit the whole illustration would be less bulky and the adjustable wing element 41 longer.

Figure 7:
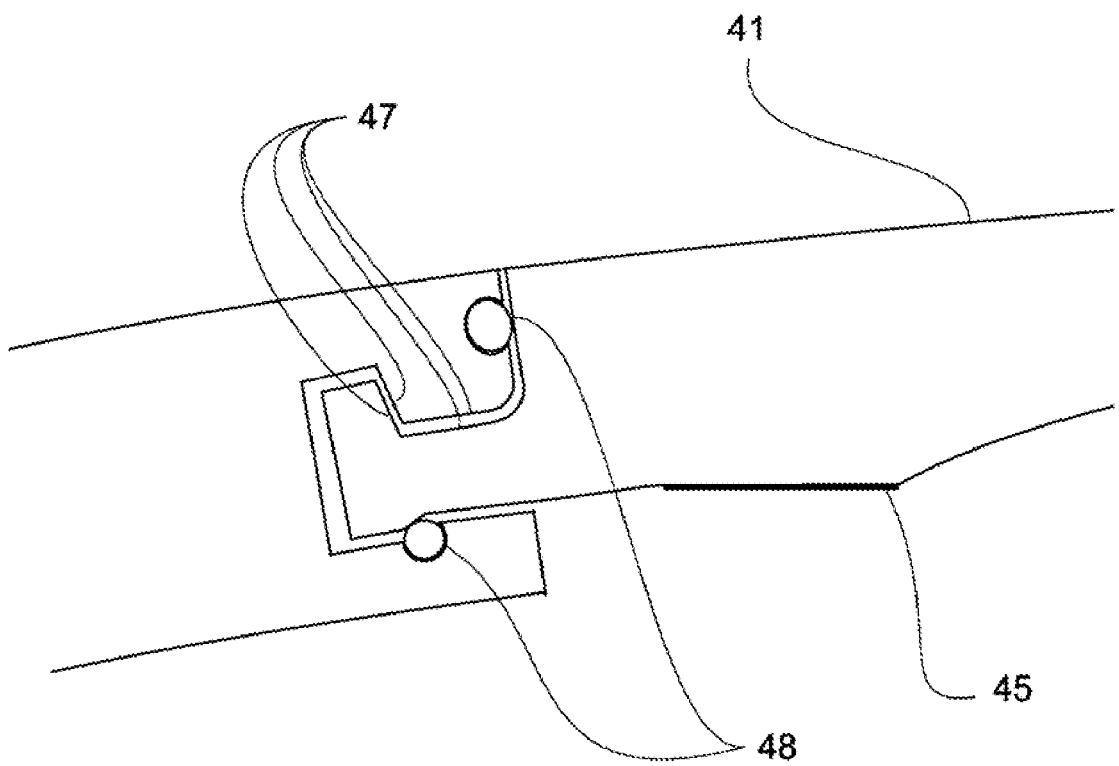
FIG. 7 is a diagram showing details of the schematic profile of FIG. 6.

FIG. 7 is a diagram showing details of the schematic profile (FIG. 6) by the upper hatch locking mechanism 40 to illustrate of a possible arrangement of the flexible tape 45, the sliding bearings 47 and the sealing elements 48.

Figure 8:
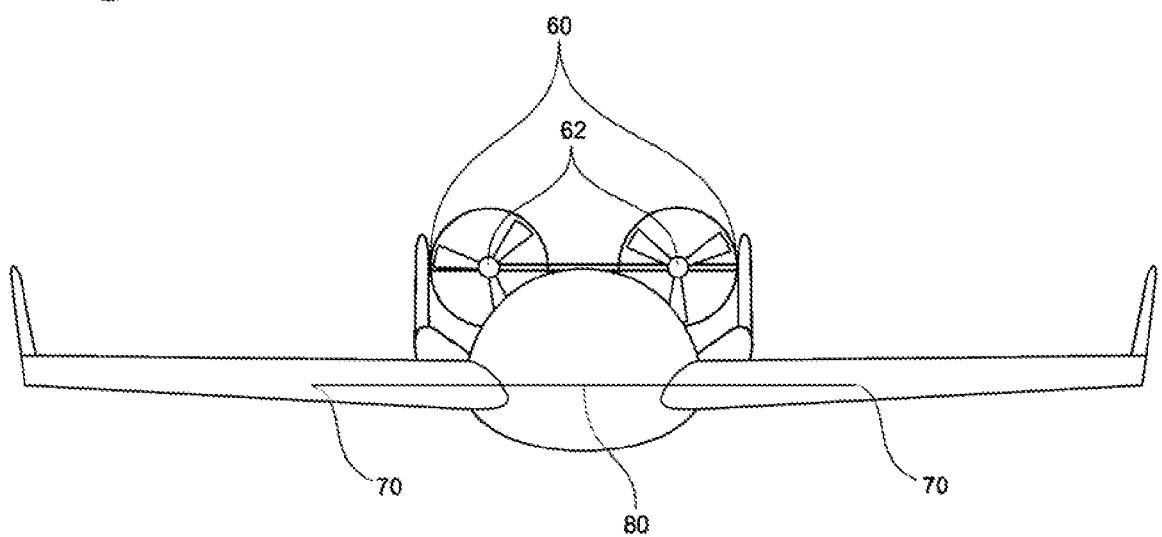
FIG. 8 is a diagram showing an airplane from front in the cruise flight modus.

FIG. 8 is a diagram showing an airplane from front in the cruise flight modus. The airplane is viewed from front in the cruise flight modus (stabilator drive combination swung to the horizontal) to illustrate the dihedral form stabilizing around the longitudinal axis/roll-axis of the wings. Gear or wheels are not depicted.

FIG. 9 is a diagram showing exemplary land flights in the hover flight modus and in the cruise flight modus with common touch down point. Also illustrated are the changes between the mode and accordingly between the parallel paths during the flight. The common angle of approach varies according to dimensioning of the airplane.

The weight saving is essential for an economic operation, therefore, it should be advantageous to use very optimum modern materials to reduce the total weight. Also with the choice of the drive engines the total weight should be considered. It is a matter of noting that the speed areas must overlap for the hover flight and the cruise flight accordingly. The dimensioning of the wings, the tail unit and the main wing area resulting from it, can happen accordingly of the known theories of the fixed wing aircraft.

Special attention is needed, because the increased wing chord leads to a reinforced pressure point wandering dependent on angle of attack, which determines the pressure point of the main wings, which is why the dimensioning of the horizontal tail unit must be carefully chosen. For the optimization of the hover flight rotors the suitable literature, in particular of the helicopter construction, can be consulted. An example of these principles is found in the above-mentioned text Walter Bittner, *Flugmechanik der Hubschraube* ("*Flight Mechanics of Helicopters*") ISBN 3-540-23654-6. The suitable disc area in the hover flight can be calculated from the hover flight performance of the rotors.

For flight control or steering mechanism in the hover flight, as well as in the cruise flight, and above all during transitions, a modern computer control suitable sensors is preferred. If necessary the flaperon can be deflected to the top like the rear part of a so-called "S-Schlag" airfoil and can therefore be used in special cases to achieve stabilization of the pitch axis/lateral axis, in addition to the horizontal tail unit. Nevertheless, a conformist dimensioning of the horizontal tail unit is preferred. The rotation direction of the rotors is advantageously achieved if the rotors rotate symmetrically along the longitudinal axis in opposite directions. Opposite direction rotation of the rotors avoids rotation yaw or moment originates with steady load in the hover flight from the rotors around the yaw (vertical) axis. While opening the shades in the cruise flight it is assumed that the right rotors are turned by the airstream (as seen from above) clockwise and the left side rotors turn counterclockwise. It can be an advantage, depending of the engines used, to intentionally cause this rotation direction of the rotors in the hover flight.

LIST OF REFERENCE NUMERALS 10 wing hatches/rotor hatches which contain rotors for the hover flight mode
20 rotors optimized for hover flight
30 hatch locking mechanisms with a set of longitudinal fins
31 longitudinal fin/lamella (turnable around the longitudinal axis/roll-axis)
32 axes of rotation of the longitudinal fin
33 bar to control the deflection angle of the longitudinal fins
40 roll-shutter (scroll/roller blind) consisting of several elements
41 wing elements which can be slid sideways
42 extreme wing element which doesn't need to be rolled up
43 tongue for good hold and sealing of the elements in a tongue-and-groove arrangement
44 groove matching the tongue of the next element
45 flexible tape for the transport of the elements
46 spindle to roll up the wing elements
47 floating bearing/sliding bearings/ball bearing/magnetic bearing along the front and rear hatch edges
48 Hydraulically increasable sealing tubes/mechanically adjustable sealing elements along the hatch edges
50 central rotor axis
51 central rotor engine
52 outer rotor engines
53 power transference by shafts running through a spoke from the outer engines to the rotor axis
60 tiltable stabilator drive combinations/impeller gondolas
61 axes of rotation of the stabilator drive combination
62 for cruise flight optimized (impeller-) drive
63 tilting angle of the stabilator drive combination
70 front wing tips
71 approximate positions of the pilot's eyes (in the hover flight mode backrest set up almost vertical)
72 angle of unobstructed view
80 two connected bars shaping a vertex protecting from cables etc.
90 touch down point for cruise flight landing and for hover flight landing
91 approach slope in the hover flight modus
92 approach slope in the cruise flight modus
93 slow down to switch from cruise flight->hover flight
94 acceleration to switch from hover flight->cruise flight
95 final arch of the cruise flight landing
96 landing roll distance of cruise flight modus landing
100 flap aileron combination, known as a flaperon
110 solid-propellant rockets as an emergency energy
111 outlet openings for burning, but not more required solid-propellant rockets

The invention claimed is:

1. A vertical take-off and landing aircraft having at least two main wings, the aircraft, comprising:
   a) a part of each main wing holding two closable round wing hatches, with internal rotors which accelerate air downwards, which can be fully closed or opened according to use and non-use of the internal rotors;
   b) an upper wing hatch closure mechanism positioned on the upper side of each of the main wings;
   c) a lower wing hatch closure mechanism, positioned on the lower side of each main wing, comprising a set of longitudinal fins extending parallel to a longitudinal axis of the aircraft, which turn about the longitudinal axis, which enable a continuous and rapidly modifiable deflection of the fins exiting air to the left and right, said fins further capable of effecting closing of the wing hatches on the lower side of each main wing by turning about the longitudinal axis; and
   d) an elevator or stabilator positioned in the rear, above the level of the main wings, separated from a fuselage of the aircraft and main wings, and which has attached gondolas holding thrust devices consisting of at least one of the group consisting of impellers, free propellers, jet turbines and rocket engines, and which are optimized for cruise flight but also functional in hover flight, and whereby the elevator or stabilator with the gondolas can be tilted from vertically down to horizontally to the rear about a cross-axis or lateral axis so that the air exit stream, exhaust jet stream or exiting air blast neither touches the main wings nor the fuselage, and whereby air intake cones of the thrust devices do not significantly affect the aerodynamics of the main wings or the fuselage.

2. The aircraft of claim 1, wherein the upper wing hatch closure mechanism comprises, for each of the main wings, a roll-shutter comprising a scroll or roller blind, with plural elements forming a curved aerodynamic shape, configured to roll up on a spindle in each main wing, aside of the wing hatch, in order to open the wing hatch on top for hover flight, wherein for cruise flight, the unrolling of the roll-shutter allows the elements slide along the hatch edges into their positions above the wing as an upper hatch closure, in order to close the wing hatch on top.

3. An aircraft according to claim 2, wherein the main wings have a configuration characterized by two wing tips, which extend to the front aside of the cockpit window, respectively a gap between the front parts of the wings for unobstructed visibility.

4. An aircraft according to claim 3, characterized by two connected bars shaping a vertex, respectively an arched bar, between the two front wing tips, which neither obstructs the view nor the aerodynamics significantly, but prevents the aircraft from becoming hooked up in the event of a collision with cables in the air and helps protect the cockpit glass when maneuvering and taxiing on the ground.

5. An aircraft according to claim 2, further comprising:
a tongue-and-groove arrangement along the plural elements of the roll-shutter, the tongue-and-groove arrangement to hold the roll-shutter elements in place to securely resist the lift and drag forces in cruise flight.

6. An aircraft according to claim 5, further comprising sealing tubes provided to effect sealing at front and rear edges of the roll-shutter.

7. The aircraft of claim 1, wherein the wing hatch closure mechanism on the upper side of the main wings comprises plural elements, curved to form an aerodynamic shape, which glide individually aside the wing hatch to open the wing hatches for hover flight, and wherein for the cruise flight, the elements are pushed out along the wing hatch edges to be positioned above the wing hatch and pushed together, in order to close the wing hatch on top.

8. The aircraft of claim 1, further comprising rotor drives for the rotors comprising one or more engines selected from the group consisting of electric motors and combustion engines with at least one engine transferring its power to a central axis of each rotor, through at least one of the group consisting of shafts, chains and belts.

9. The aircraft of claim 1, wherein the main wings have configurations characterized by two wing tips, the wings and wing tips which extend to the front aside of a pilot's cockpit window, provide a gap between the front parts of the wings for unobstructed forward visibility.

10. The aircraft of claim 9, due to the small wing loading in cruise flight enhanced by the unobstructed visibility to the front and down, allows the same steep approach angle for both flight modes, so the pilot can switch at any time between the hover flight modus and the cruise flight modus and still aim and land on the same touch-down point, however, in cruise mode with much smaller angle of attack and correspondingly larger forward and descend speed resulting in the need of a short rolling distance when landing in cruise mode, wherein the rolling distance in cruise mode landing can be minimized through the use of the rotors at touch-down.

11. The aircraft of claim 1, characterized by large ailerons at the trailing edge of the main wings, used as flaperons, which not only permit the regulation of the lift force, but also enables a slow flight, at the transition from hovering flight modus into the cruise flight modus, with a minimized angle of attack, so that the forces generated by the rotors) in the main wings do not interfere with the acceleration of the aircraft.

12. The aircraft of claim 1, wherein are individually ignitable and individually, through discharge outlets, releasable solid fuel rockets at various points on the aircraft, so that they generate an upward force in relation to the aircraft coordinate system and an individual torque.

13. An aircraft according to claim 1, wherein:
the part of each main wing that holds the closable round wing hatches comprise one half or more of that wing.

14. An aircraft according to claim 1, wherein:
the part of each main wing that holds the closable round wing hatches comprise one half or more of that wing; and
the part of each main wing holding two or more closable round wing hatches.

15. The aircraft of claim 1, further comprising rotor drives for the rotors comprising a plurality of engines selected from the group consisting of electric motors and combustion engines with one engine situated in the center of each rotor, and at least one remaining engine outside the rotor area, transferring power to a central axis of at least one rotor on each wing, through at least one of the group consisting of shafts, chains and belts.

16. An aircraft according to claim 1, wherein the two closable wing hatches of each wing comprise a front round wing hatch having a planar area smaller than that of a rear wing hatch.

17. An aircraft according to claim 1, wherein:
the connection of the elevator or stabilator with the rest of the aircraft is implemented as a twin boom structure.

18. A vertical take-off and landing aircraft having main wings, the aircraft, comprising:
a) a part of each main wing holding two closable round wing hatches, with internal rotors which accelerate air downwards, which can be fully closed or opened according to use and non-use of the internal rotors;
b) a lower wing hatch closure mechanism, positioned on the lower side of each main wing, comprising a set of longitudinal fins extending parallel to a longitudinal axis of the aircraft, which turn about the longitudinal axis, which enable a continuous and rapidly modifiable deflection of the fins exiting air to the left and right, said fins further capable of effecting closing of the wing hatches on the lower side of each main wing by turning about the longitudinal axis; and
c) an elevator or stabilator positioned in the rear, above the level of the main wings, separated from a fuselage of the aircraft and main wings, and which has attached gondolas holding thrust devices consisting of at least one of the group consisting of impellers, free propellers, jet turbines and rocket engines, and which are optimized for fast cruise flight but are also functional in hover flight, and whereby the elevator or stabilator with the gondolas can be tilted from vertically down to horizontally to the rear about a cross-axis or lateral axis so that the air exit stream, exhaust jet stream or exiting air blast neither touches the main wings nor the fuselage, and whereby air intake cones of the thrust devices do not significantly affect the aerodynamics of the main wings or the fuselage
wherein the main wings have configurations characterized by two wing tips, the wings and wing tips which extend to the front aside of a pilot's cockpit window, provide a gap between the front parts of the wings for unobstructed forward visibility, and further characterized by two connected bars shaping a vertex, respectively an arched bar, between the two front wing tips, which neither obstructs the view nor the aerodynamics significantly, but prevents the aircraft from becoming hooked up in the event of a collision with cables in the air and helps protect the cockpit glass when maneuvering and taxiing on the ground.

19. A vertical take-off and landing aircraft having main wings, the aircraft, comprising:
a) a part of each main wing holding two closable round wing hatches, with internal rotors which accelerate air downwards, which can be fully closed or opened according to use and non-use of the internal rotors;
b) an upper wing hatch closure mechanism positioned on the upper side of each of the main wings;
c) a lower wing hatch closure mechanism, positioned on the lower side of each main wing, comprising a set of longitudinal fins extending parallel to a longitudinal axis of the aircraft, which turn about the longitudinal axis, which enable a continuous and rapidly modifiable deflection of the fins exiting air to the left and right, said fins further capable of effecting closing of the wing hatches on the lower side of each main wing by turning about the longitudinal axis;

d) an elevator or stabilator positioned in the rear, above the level of the main wings, separated from a fuselage of the aircraft and main wings, and which has attached gondolas holding thrust devices consisting of at least one of the group consisting of impellers, free propellers, jet turbines and rocket engines, and which are optimized for fast cruise flight but are also functional in hover flight, and whereby the elevator or stabilator with the gondolas can be tilted from vertically down to horizontally to the rear about a cross-axis or lateral axis so that the air exit stream, exhaust jet stream or exiting air blast neither touches the main wings nor the fuselage, and whereby air intake cones of the thrust devices do not significantly affect the aerodynamics of the main wings or the fuselage; and two wing tips, which extend to the front aside of the cockpit window, respectively a gap between the front parts of the wings for unobstructed visibility.

* * * * *